Oct. 25, 1949.    F. A. KING    2,485,741
REELING MECHANISM
Original Filed March 23, 1945    2 Sheets-Sheet 1
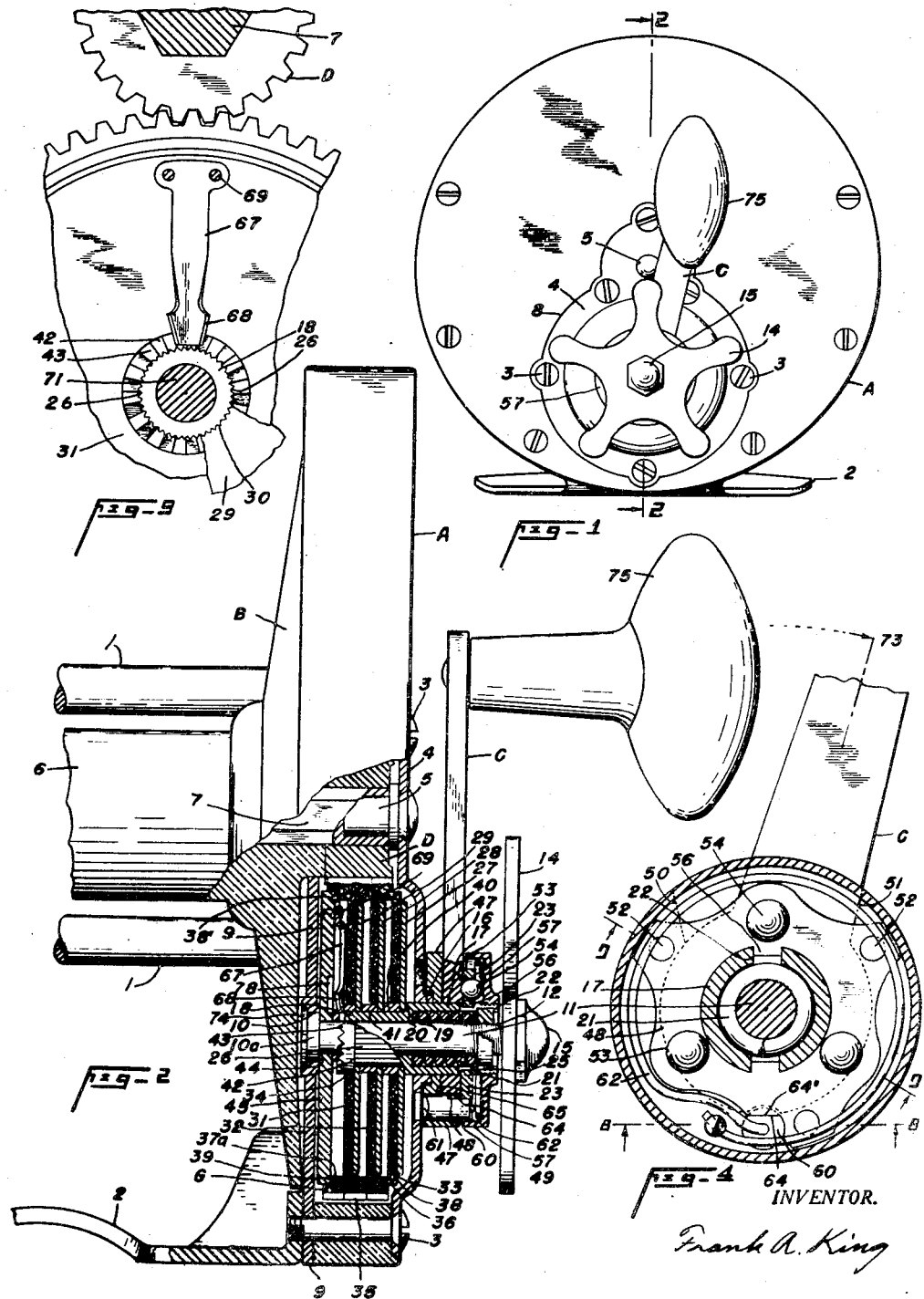
INVENTOR.
Frank A. King Oct. 25, 1949.　　　　　F. A. KING　　　　2,485,741
REELING MECHANISM
Original Filed March 23, 1945　　　　　　2 Sheets-Sheet 2
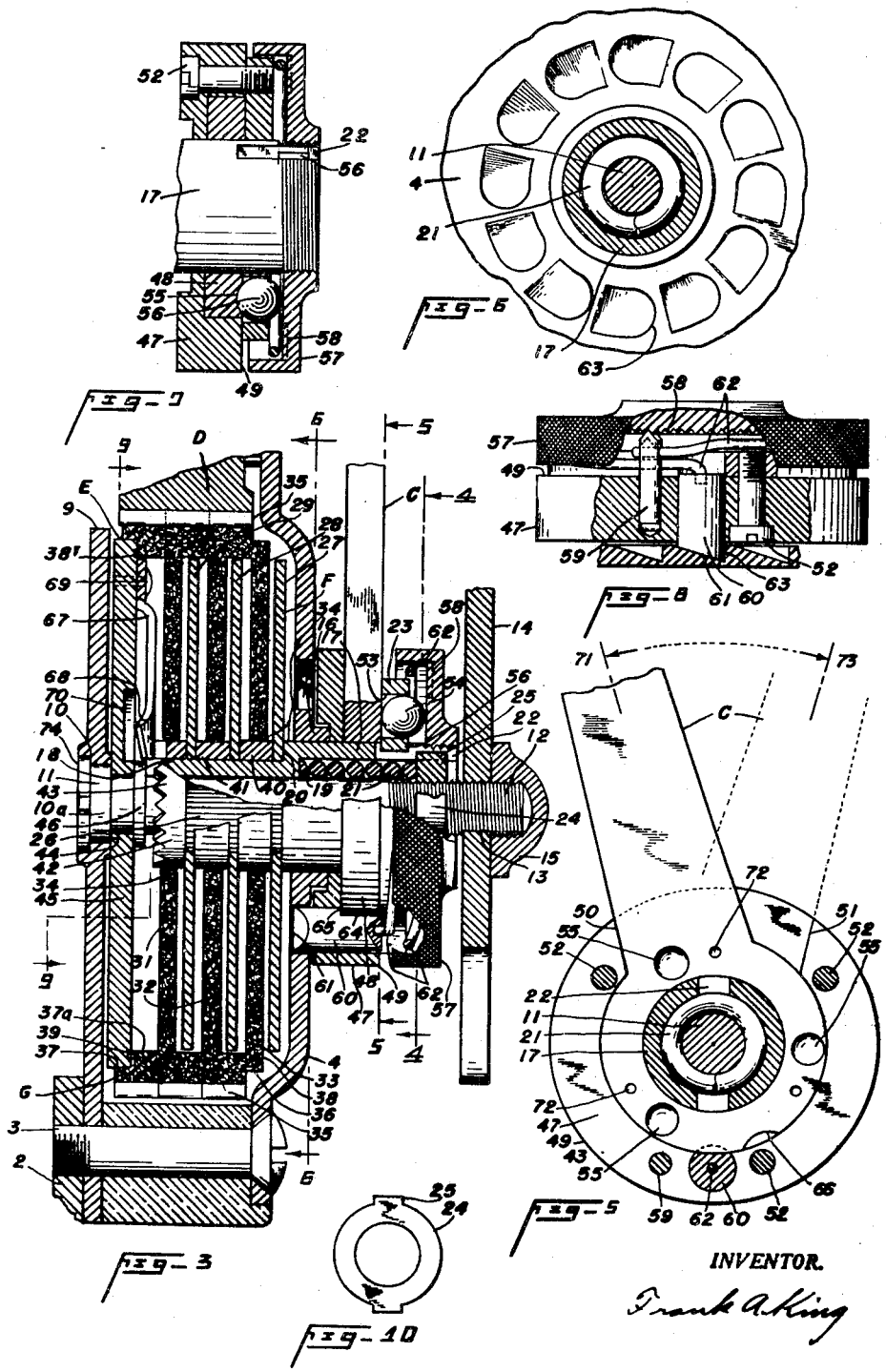
INVENTOR.
Frank A. King Patented Oct. 25, 1949

2,485,741

UNITED STATES PATENT OFFICE 2,485,741

REELING MECHANISM

Frank A. King, deceased, late of Los Angeles, Calif., by William Scott King, Tujunga, and Ernest Lynn King, Los Angeles, Calif., and A W. Tedstrom, Parsons, Kans., administrators, assignors to Mary L. King, Tujunga, Calif.

Substituted for abandoned application Serial No. 584,296, March 23, 1945. This application July 25, 1947, Serial No. 763,651

17 Claims. (Cl. 242—84.6)

This application is a substitute for abandoned application Serial No. 584,296, filed March 23, 1945.

This invention relates to reeling mechanism for crank operated reels of various types, and more particularly to fishing reels of the combined automatic click and anti-backlash type.

Heretofore, in the use of the conventional star drag reel, for certain well known reasons, it is common practice to preset the drag tension before casting the line. In the event of an unexpected, sizable catch many hundred yards of line may be carried out by the fish, which reduces the convolutional core diameter on the spool, thereby greatly increasing the ratio by which the drag tension was previously set. In order to avoid breaking the line, such increased tension is of course released with ease while the crank is at rest, however, it will be understood that subsequent rewinding will require an equal amount of increased drag tension which obviously is difficult to adjust simultaneously with the reeling-in operation. Therefore, it is an object of the present invention to transpose the crank and the star adjusting wheel and arrange the associated parts thereof in a more convenient relationship, so as to greatly facilitate the angler's right hand in cranking in the line and making simultaneous adjustments of the star wheel without retarding effect in the operation.

The primary object of this invention resides in the construction of a driven and driving element, the latter including a telescopic shaft associated with a compression spring for forcing the elements into frictional engagement and thrust transmitting members carried by the shaft and associated with the crank, the ratchet and pawl and adapted to forcibly separate the clutch elements on relative rotational movement between the crank and the pawl, thus automatically engage or disengage the clutch elements on forward or retrograde rotational movement of the crank respectively.

Another important object of this invention resides in the provision of means by which a greater diaphragmatical frictional surface is obtainable in a comparatively limited space by the employment of multiple disk, male and female units, associated with the spool drive pinion gear. This type of clutch mechanism affords the advantages of being extremely resilient and flexible with respect to line control, and the same may be instantly and completely declutched without dragging effect for free clutch action, thus providing a reel structure that is free from the usual axially shiftably engaging gears, keys or lugs between the crank and the spool.

In using a rod and reel in the customary manner, the angler after each cast immediately shifts the rod to the left hand, thereby freeing the right hand to manipulate the various line-controlling features of the reel. Therefore, a meritorious object of the present invention resides in the provision of means including a combined click and backlash preventer, disposed on the right hand side of the reel, so the same may be adjusted by the angler's right hand as the line is being paid out and which preventer, in use, will not interfere with the line winding-in operation of the spool, the same taking effect automatically when the reel is used in casting.

Other objects of the invention will become apparent as the detail description thereof proceeds.

In the drawings:

Fig. 1 is a side elevational view of a reel structure embodying my invention.

Fig. 2 is a fragmental central sectional view, on enlarged scale, through the reeling mechanism, taken along the line 2—2 of Fig. 1 certain parts being shown in elevation.

Fig. 3 is an enlarged fragmental view of Fig. 2, showing the clutch mechanism in its disengaged or free clutch operating position.

Fig. 4 is a sectional view taken along the line 4—4 of Fig. 3.

Fig. 5 is a sectional view taken along the line 5—5 of Fig. 3.

Fig. 6 is a fragmental sectional view taken along the line 6—6 of Fig. 3.

Fig. 7 is a sectional view taken along the line 7—7 of Fig. 4.

Fig. 8 is a sectional view taken along the line 8—8 of Fig. 4.

Fig. 9 is a sectional view taken along the line 9—9 of Fig. 3.

Fig. 10 is a separate view showing a wing or keyed nut also shown in Figs. 2, 3 and 7.

Referring to Figs. 1 to 10 inclusive, there is illustrated a preferred form of the improved cranking mechanism applied to the driving system of a conventional type fishing reel.

It is seen that such a reel includes a recessed head plate A to which is connected the usual pillars 1 and the reel seat 2, the latter parts extending to the tail plate, not shown.

Attached to the opposite side of plate A, by means of screw 3, is an outwardly curved cover or ratchet plate 4 having an inwardly projecting stud support 5. Supported on the stud 5 is the spool B, having a tubular hub 6 of hexagon internal form receiving a shaft 7 of corresponding external form which is provided with a co-axial socket seated over the stud 5 for rotation. A crank C is mounted on the plate A for operating the spool B.

With reference to Figs. 1, 2 and 3, it will be seen that the head plate is formed with an eccentric and concentric opening which intersect each other. The outer face of plate A is correspondingly recessed as at 8 for the peripheral support of the ratchet plate 4 which is suitably inlaid in said recess 8, thus providing a gear chamber for the pinion gear D and the clutch unit E. Screws 3 are passed through apertures in the plate A and threaded in registering threaded apertures of the bridge plate 9 disposed on the inner side thereof, along with the reel seat 2 which is also provided with corresponding threaded apertures for the support thereof.

In the embodiment of the invention, selected for illustration in Figs. 1 to 9 inclusive, and referring first to Figs. 2 and 3, it will be seen that the central portion of the bridge 9 is provided with a counter-bored bearing 10, wherein is journalled the headed end 10a of a clutch frictional adjusting bolt or shaft 11, the opposite end of which shaft is screw-threaded 12 and flattened 13 for fixed reception of a star adjusting wheel 14, secured thereto by a hexagon cap nut 15 which is screw-threadedly engaged therewith.

The ratchet plate 4 is also provided with a central bearing 16, wherein is journalled a tubular shaft 17 which telescopes over shaft 11 and together with the assembled parts comprises the driving element F of the clutch unit E.

Shaft 17 is formed with a reduced inner end 18 and the opposite end thereof is of enlarged inner diameter, thus forming a cylindrical recess adjacent an offset wall and internal and external shoulders 19 and 20, respectively. The shoulder 19 provides abutment for the compression spring 21, and the larger diameter thereof is diametrically slotted as at 22 to provide keyways for internally projecting keys of a star-shaped plate 23, hereinafter to be described. An adjusting nut 24, formed with diametrically disposed lugs 25, entering the slots 22 for screw-threaded engagement with the threaded portion 12 serves to adjust the compression resistance of the spring 21 between the shoulder 19 and this nut 24, on relative rotational movement of the star wheel 14.

As shown in Figs. 2 and 3, the reduced diameter 18 affords a series of splines or serrations 26 which drive the disks 27, 28 and 29, made of spring brass or other suitable resilient material and formed with inwardly projecting splines 30 engaging the splines 26.

There is provided a female driven clutch element G of special design, including resilient disks 31, 32 and 33, made of fiber or other suitable frictional material which are identical in form, each provided with a central aperture 34 and an offset gear-toothed periphery 35; such offset forms external and internal shoulders 36 and 37 respectively. The latter disks afford a diaphragmatical area which is reduced in thickness, thus providing a second or innermost shoulder 37a and an annular deep recess which permits axial shifting clearance for said metal disks therebetween. Adjacent the periphery of said shoulder 36, is provided the outer face thereof with a rectangular shaped annular groove 38 and the opposite face thereof is provided with a second recess which forms an annular rectangular shaped tongue 39 conforming to the groove 38 whereby, in assembly, the latter disks are dovetailed together as an integral unit by means of the flanges 39 being press-fitted in the groove 38, whereby the offset peripheral portion of the fiber disks are interlocked and restrained against distortion from diaphragmatical action thereof, so as to increase the combined rigidity of the united gear-toothed periphery and thus render the diaphragmatical area thereof more yieldable to resilient clutch action.

In assembly the disks 27, 28 and 29 are alternately interposed with respect to the offset disks 31, 32 and 33 along with the spacer rings 40, 41 and the click ring 42, which ring is provided with click teeth 43.

Click ring 42 is also provided with internal splines and press-fitted over the splines 26, thus securing the metal disks 27, 28 and 29 against axial movement with respect to the tubular shaft 17.

A second shoulder 44 on bolt 11 abuts an apertured annular thrust plate 45, of equal diameter to the internal shoulder 37 also provided with an annular groove 38' corresponding to the flanges 39 whereby this plate is united with the driven element in the same manner as the offset disks. A retainer washer 46 is press-fitted over the bolt 11, abutting the plate 45, so as to prevent axial displacement of the driven element during free clutch action, at which time the spacer ring 40 serves as a bearing or guide for the outer side of element G, the latter being free to idly rotate on the inner end of bolt 11 and the ring 40, except as it may be frictionally driven. Obviously, natural working stresses of the fiber disks, when under thrust pressure, is such as to retain the parts in their proper place and their gear teeth 35, being in constant mesh with gear D, prevent accidental rotational displacement thereof.

It will be observed that a clutch unit has been provided including male and female units, wherein the male unit is comprised of resilient disks centrally supported in spaced relation, and the female unit consists of spaced resilient inwardly extending disks, each supported by its peripheral diaphragmatical area. The disks are thus effectively mounted and supported for combined resilient or diaphragmatical clutch action in an interlocking relation, yet they may be efficiently assembled or disassembled. This also facilitates and improves upon the fabrication of the female unit. Obviously, the rotation of this unit during the casting operation provides a slight inherent resistance which tends to synchronize the spool speed with that of the line, thus assist in preventing backlash.

It will be seen that there is provided shaft 17 with an annular cup-shaped ratchet pin or pawl carrier-member 47 which is centrally bored to fit over the tubular shaft 17 and counterbored to receive the outer end of bearing 16.

The end of crank C, opposite its free end, is formed with a ring-like hub 48 which serves as a thrust transmitting member, and the carrier 47 is provided with an annular C-shaped axially projecting collar 49 having an arcuate section omitted, thus forming therein spaced stop shoulders 50 and 51; this collar portion receives the crank and its hub 48 for limited rocking movement therein and between the shoulders 50 and 51. This hub 48 is retained in the carrier 47 by means of the plate 23 and screws 52 which are passed through counterbored apertures in the collar 49 and threadedly engage the registering threaded apertures in the plate 23, the latter of which in this instance constitutes a ball cage which is provided with three ball retaining channels 53, spaced 120° apart, for the clutch actuating steel balls 54.

As shown in Figs. 2, 5 and 7, the outer face of crank hub 48 includes three concave ball sockets 55 of the same curvature as balls 54, also spaced 120° apart. Integral keys 56 of the cage 23 enter the slots 22 for driving shaft 17, yet permit axial movement thereof. The shaft's outer end is screw-threadedly engaged with a knurled adjusting nut or thrust transmitting member 57, resting under the urge of spring 21 on the balls 54. This nut 57 is recessed, wherein is provided an annular circle of axially extending radial teeth or serrations 58.

Diametrically opposite the stop shoulders 50 and 51, the collar portion 49 is provided with a socket, receiving a detent pin 59, having a wedge-shaped end conforming in shape to and abutting the serrations 58. Adjacent this pin 59, the collar 49 is provided with a bore which is intersected by the peripheral path of hub 48, wherein is mounted for axial movement a ratchet pin or pawl 60 having a beveled end 61, and the opposite end thereof affords a socket which receives the right angle bent over end of a circular spring 62 that surrounds the ball cage 23 and passes through the aperture detent pin 59.

Spring 62 is so arranged that its ends tend to laterally or axially separate, thereby functioning to urge the detent pin 59 against the serrations 58 while its opposite end co-acts with the pawl 60 and the inclining U-shaped indentures or ratchet teeth 63, so as to prevent retrograde movement of the carrier 47.

As shown more clearly in Fig. 4, the upper side and outer end of pawl 60 is flatted as at 64 thus forming a shoulder 65, and the lower peripheral contour of ball cage 23 at this location is provided with a complementary flat bearing surface 64' which abuts the flatted surface 64, thus preventing accidental rotational displacement of the pawl 60 when the periphery of hub 48 is shifted or rocked in operation. As shown in Fig. 5, numeral 66 indicates an arcuate recess in the periphery of hub 48 which provides an opening for the shoulder 65 to enter when the pawl 60 is functioning as a ratchet pin or pawl in the conventional manner.

With reference to Figs. 2, 3 and 9 it will be seen that the driven clutch element G carries an offset blade spring 67 having an integral click-head 68, and the radially outer end thereof is securely attached to the plate 45 by suitable rivets 69. This plate 45 is recessed as at 70 so that the head 68 is free to coact with the click teeth 43 by dropping from tooth to tooth when the driven clutch element G is rotating with respect to the driving element F, as when functioning as a drag, thus producing suitable clicking sound which indicates the value of frictional resistance being produced by the clutch unit E.

Assuming the clutch to be engaged (such position being shown in Figs. 2 and 4), therefore previous to the disengaging operation, the balls 54 are seated in their respective sockets 55, as shown in Fig. 2, and the crank and its hub 48 are moved in the retrograde direction of travel as indicated by arrow 71. Obviously, due to the spring 21 such movement tends to drive the carrier 47 and its assembled parts, including its pawl 60, in the same direction of travel until the latter coacts with one of the ratchet teeth 63, thus restraining further movement of the carrier 47, yet the hub 48 and its sockets 55 continue to rotate with respect to the channels 53 consequently forcing the balls 54 out of their sockets 55 against the adjusting nut 57 which in turn shifts the shaft 17 longitudinally outwardly, thus compressing the spring 21 which is of sufficient length and suitable resiliency to permit axial shifting of the metal disks 27, 28 and 29 from the fiber disks 31, 32 and 33 respectively. Obviously, the full thrust load of spring 21 is transferred from the latter disks and absorbed by the assembled parts including the adjusting nut 57, balls 54, hub 48, carrier 47 and the bearing 16, thus producing a frictional resistance between the latter and the bolt head 10a, which parts serve to retain the clutch unit E in its disengaged or free clutch operating position.

The crank C still proceeds in its relative movement until it abuts the shoulder 50; at this position the balls 54 register and seat in the shallow detent dimples 72 which prevent accidental displacement of the crank C.

As shown in Fig. 3, the click teeth 43 are moved axially outward from the click-head 68 so that the apex of teeth 43 delicately contact the head 68 as it rotates about the teeth 43 thus producing a slight clicking sound which indicates the extent of value of a slight rotational resistance therebetween, which is employed to control over-running of the spool through the medium of the driven clutch element G, and the pinion gear D.

Obviously, there is provided a peripheral knurled nut 57, adjustable by the angler's right hand which, when adjusted, will effect the limits of outward movement of shaft 17, and in turn its connected teeth 43 with respect to the revolving head 68, thus adjusting the aforesaid resistance therebetween so that the angler may control the casting speed of the spool and thus synchronize its speed with that of the bait and line.

Referring to Figs. 3 and 8. In the normal cranking operation, the crank hub 48 is of course rotated in the right hand direction as indicated by the arrow 73, which movement automatically engages the clutch unit E for driving the spool B. It will be seen that the pawl 60 is arranged so that the shoulder 65 and its opposite beveled end 61 wedge between one of the inclining ratchet teeth 63 and the inner peripheral marginal face of the hub 48, so as to detain rotational movement of the carrier 47 only until the arm of crank C abuts the shoulder 51. During this limited movement the balls 54 slide into the sockets 55 and thus engage the clutch; co-incidentally the arcuate recess 66 registers with the ratchet pin 60 which permits normal pawl action with the ratchet teeth 63.

Shaft 17 is of suitable length, relative to the depth of sockets 55, to permit its assembled disks 27, 28 and 29 to frictionally seat upon the fiber disks 31, 32 and 33, the latter of which then absorbs the full preset pressure load of spring 21, thus relieving all thrust on the balls 54 and all torsional resistance due to spring thrust between bearing 16 and the bolt head 10a, the latter of which is then free to rotate as a trunnion in the bridge 9.

It will now be seen that flange 74 serves to prevent outward axial displacement of the bolt 11 and its connected parts and that the entire cranking assembly is free to frictionally drive the clutch element G and the spool B through the medium of gear D and the shoulder 51 on the carrier 47.

The convolutions of spring 21, being in slight contact with the periphery of bolt 11 so as to provide friction load suitable to prevent accidental rotational displacement, yet permit manual adjustment thereof.

When it is desired to increase frictional resistance of the clutch unit E simultaneously with reeling in the line, the knob 75 is held by the operator's thumb, forefinger and the ring finger while permitting the index finger to extend slightly outward so that, on its upward swinging movement, it passes through and engages the star wheel 14, the counter-balance end of crank C being eliminated for this purpose. Obviously this operation will effect intermittent rotational movement of the star wheel 14 with respect to shaft 17 and its connected shaft 11 and, in turn, its right hand threads 12 will effect inward axial movement of the nut 24 thus increasing the urge of spring 21 and in turn the frictional resistance of the engaged clutch unit E.

The improved reeling mechanism may be applied to various types of reels and the parts are comparatively few, there being a two-purpose crank, a two-purpose clutch spring, a two-purpose click, a two-purpose pawl spring, and a three-purpose pawl, all of which parts are effectively mounted and they are simple in form, therefore easy to assemble.

It is evident that various changes may be resorted to in the construction, form and arrangement of the several parts, without departing from the spirit and scope of the invention, hence there is no intention to be limited to the particular embodiment herein shown and described, but what is claimed is:

1. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means.

2. In a clutch mechanism, a driving clutch element, a driving shaft carrying said element, a support on which said shaft is mounted for rotary and axial movement, a driven clutch element, spring means associated with said shaft for normally urging said clutch elements into clutching engagement with one another, a crank for driving said shaft, means for drivingly connecting said crank subject to a limited rotary movement relative to said shaft, said means for drivingly connecting said crank to said shaft including a pawl carrier fixed for rotation with said shaft, a series of ratchet teeth on said support around said shaft, a spring-loaded pawl on said carrier arranged to cooperate with said teeth and spaced stops on said carrier between which the crank is subject to being turned relative to the shaft, one of said stops effecting a driving connection between the crank and shaft on turning of the crank, said pawl and ratchet operating upon movement of said crank in a direction opposite to that in which the shaft is normally driven to lock the carrier and shaft against turning, whereby the crank may be moved in said direction relative to said shaft and carrier.

3. In a clutch mechanism, a driving clutch element, a driven clutch element, a rotary and axially movable tubular driving shaft carrying said driving clutch element, a rotary adjusting shaft operable within said driving shaft, support means for said shafts, means for turning said driving shaft including a crank and a lost-motion drive connected between the driving shaft and the crank affording a turning movement of the crank relative to said driving shaft, spring means associated with said shafts and disposed within said driving shaft for axially moving said driving shaft for urging said clutch elements into clutching engagement with one another, clutch releasing means responsive to turning of the crank relative to the driving shaft for shifting said driving shaft axially against said spring means and disengaging said clutch elements, manually operable means for turning said adjusting shaft relative to said driving shaft, and spring tension adjusting means responsive to said relative movement of the adjusting shaft.

4. In a clutch mechanism, a driving clutch element, a driven clutch element, a rotary and axially movable tubular driving shaft carrying said driving clutch element, a rotary adjusting shaft operable within said driving shaft, support means for said shafts, means for turning said driving shaft including a crank and a lost-motion drive connection between the driving shaft and the crank affording a turning movement of the crank relative to said driving shaft, spring means associated with said shafts and disposed within said driving shaft for axially moving said driving shaft for urging said clutch elements into clutching engagement with one another, clutch releasing means responsive to turning of the crank relative to the driving shaft for shifting said driving shaft axially against said spring means and disengaging said clutch elements, manually operable means for turning said adjusting shaft relative to said driving shaft, and spring tension adjusting means responsive to said relative movement of the adjusting shaft, said adjusting shaft extending outwardly beyond the point of connection of said crank with said driving shaft, said manually operable means being mounted on said extended portion of said adjusting shaft in outwardly spaced relation to said crank.

5. In a clutch mechanism, a driving clutch element, a driven clutch element, a rotary and axially movable tubular driving shaft carrying said driving clutch element, a rotary adjusting shaft operable within said driving shaft, support means for said shafts, means for turning said driving shaft including a crank and a lost-motion drive connection between the driving shaft and the crank affording a turning movement of the crank relative to said driving shaft, spring means associated with said shafts and disposed within said driving shaft for axially moving said driving shaft for urging said clutch elements into clutching engagement with one another, clutch releasing means responsive to turning of the crank relative to the driving shaft for shifting said driving shaft axially against said spring means and disengaging said clutch elements, manually operable means for turning said adjusting shaft relative to said driving shaft, and spring tension adjusting means responsive to said relative movement of the adjusting shaft, said manually operable means being located in outwardly spaced relation to said crank.

6. In a clutch mechanism, a driving clutch element, a driven clutch element, a rotary and axially movable tubular driving shaft carrying said driving clutch element, a rotary adjusting shaft operable within said driving shaft, support means for said shafts, means for turning said driving shaft including a crank and a lost-motion drive connection between the driving shaft and the crank affording a turning movement of the crank relative to said driving shaft, spring means associated with said shafts and disposed within said driving shaft for axially moving said driving shaft for urging said clutch elements into clutching engagement with one another, clutch releasing means responsive to turning of the crank relative to the driving shaft for shifting said driving shaft axially against said spring means and disengaging said clutch elements, manually operable means for turning said adjusting shaft relative to said driving shaft, and spring tension adjusting means responsive to said relative movement of the adjusting shaft, said lost-motion drive connection including a ratchet mechanism for limiting the driving shaft to rotation in one direction.

7. In a clutch mechanism, a plurality of driven clutch disks having offset peripheral portions abutting and fixed to one another and spacing the remainder of said disks from one another, gear teeth formed on said abutted peripheral portions, a plurality of driving clutch disks, and a drive shaft for said driving disks shiftable for moving said driving disks into and out of clutching engagement with said driven disks.

8. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, a resilient click member fixed for rotation with the driven clutch element, and click teeth on said drive shaft engaging the click element.

9. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, a spring click member fixed at one end to said driven clutch member and yieldingly and frictionally contacting an end of said shaft, and click teeth on said end of said shaft for engaging said click member.

10. In a reeling mechanism, a tubular shaft, centrally supported resilient disks fixed in spaced relation on the shaft, a support on which the shaft is mounted for rotational and axial movement, a driven clutch element including resilient disks peripherally supported in alternate relation to said centrally supported disks, a spring means normally urging said disks into frictional engagement with one another mounted in said shaft, a crank for driving said shaft and arranged for limited relative rotational movement with respect to said shaft, a detent means carried by said shaft and associated with said support for preventing retrograde movement of said shaft, a thrust transmitting means interposed between the crank and said shaft and associated with said detent means, said thrust transmitting means being responsive to said limited rotational movement of the crank for disengaging said clutch elements.

11. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, said thrust means including a ball carrier keyed to said shaft having an opening therein, a ball mounted in said opening, said crank having a depression therein adapted to receive said ball when the crank is in position to turn said shaft, and a thrust member fixed to said shaft, said ball being arranged to move out of said depression and against said thrust member so as to axially shift the shaft when the crank is moved in one direction relative to said shaft.

12. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, said means for drivingly connecting said crank to said shaft including a pawl-carrying member keyed to said shaft having spaced stops thereon between which said crank is movable relative to said shaft, ratchet teeth on said support, and a spring-loaded pawl carried by said pawl-carrying member and engaging said teeth for limiting the shaft to rotation in one direction.

13. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, said means for drivingly connecting said crank to said shaft including a pawl-carrying member keyed to said shaft having spaced stops thereon between which said crank is movable relative to said shaft, ratchet teeth on said support, and a spring-loaded pawl carried by said pawl-carrying member and engaging said teeth for limiting the shaft to rotation in one direction, and means operating responsive to movement of the crank into a position in which the clutch elements are declutched for holding said pawl in locking engagement with said teeth and which release said pawl only when said crank is returned to a position for turning said shaft.

14. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, said means for drivingly connecting said crank to said shaft including a pawl-carrying member keyed to said shaft having spaced stops thereon between which said crank is movable relative to said shaft, ratchet teeth on said support, and a spring-loaded pawl carried by said pawl-carrying member and engaging said teeth for limiting the shaft to rotation in one direction, and means operating to lock the shaft against turning while the crank is being moved relative to the shaft to a position for turning said shaft and which releases said shaft when the crank reaches the position for turning said shaft.

15. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, said thrust means including a ball carrier keyed to said shaft having an opening therein, a ball mounted in said opening, said crank having a depression therein adapted to receive said ball when the crank is in position to turn said shaft, and a thrust member fixed to said shaft, said ball being arranged to move out of said depression and against said thrust member so as to axially shift the shaft when the crank is moved in one direction relative to said shaft, said means for drivingly connecting said crank to said shaft including a means operating to lock the shaft against turning while the crank is being moved from a position in which the clutch elements are disengaged to a position for turning said shaft and which releases said shaft when the crank reaches said position for turning said shaft.

16. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, a spring click tongue fixed to said driven clutch element, click teeth on said shaft engaged with said tongue to frictionally resist rotation of said driven clutch element, a screw threaded portion on said shaft, a screw threaded member arranged to be manually turned on said screw threaded portion to cooperate with said thrust means and shift the shaft axially for varying the tensioned engagement of said click teeth with said click tongue.

17. In a clutch mechanism, a driving clutch element, a driving shaft carrying said clutch element, a support on which said shaft is mounted for rotary and axial movement, a driven clutch element, spring means normally urging said clutch elements into clutching engagement with one another, a crank for driving said shaft, means for drivingly connecting said crank to said shaft with said crank subject to a limited rotary movement relative to said shaft, and thrust means responsive to limited rotary movement of said crank relative to said shaft for shifting said shaft axially and declutching said clutch elements against the action of said spring means, a spring click tongue fixed to said driven clutch element, click teeth on said shaft engaged with said tongue to frictionally resist rotation of said driven clutch element, a screw threaded portion on said shaft, a screw threaded member arranged to be manually turned on said screw threaded portion to cooperate with said thrust means and shift the shaft axially for varying the tensioned engagement of said click teeth with said click tongue, and a detent means for holding said screw threaded member against unintentional turning.

WILLIAM SCOTT KING,
ERNEST LYNN KING,
A W. TEDSTROM,
Administrators of the Estate of Frank A. King, Deceased

REFERENCES CITED

The following references are of record in the file of this patent:

UNITED STATES PATENTS

| Number | Name | Date |
| --- | --- | --- |
| 1,170,784 | Sunden | Feb. 8, 1916 |
| 2,219,322 | King | Oct. 29, 1940 |
| 2,363,533 | King | Nov. 28, 1944 |